United States Patent [19]

Dunham et al.

[11] Patent Number: 4,791,565
[45] Date of Patent: Dec. 13, 1988

[54] APPARATUS FOR CONTROLLING THE USE OF COMPUTER SOFTWARE

[75] Inventors: Michael D. Dunham, Shorewood; Thomas M. Dykstra, Mequon; Donald W. Vahlsing, Grafton; Paul L. Ehlers, Menasha, all of Wis.

[73] Assignee: Effective Security Systems, Inc., Milwaukee, Wis.

[21] Appl. No.: 622,657

[22] Filed: Jun. 20, 1984

[51] Int. Cl.⁴ .......................................... G06F 12/14
[52] U.S. Cl. .......................................... 364/200; 380/4
[58] Field of Search ... 364/200 MS File, 900 MS File; 178/22.01, 22.08, 22.09; 340/825.31, 825.34; 235/379, 380, 382, 382.5; 380/3, 4, 23–25; 358/349

[56] References Cited

U.S. PATENT DOCUMENTS

| | | | |
|---|---|---|---|
| 3,806,882 | 4/1974 | Clarke | 364/200 |
| 3,931,504 | 1/1976 | Jacoby | 235/153 A |
| 4,114,139 | 9/1978 | Boyd et al. | 340/147 |
| 4,168,396 | 9/1979 | Best | 178/22 |
| 4,184,201 | 1/1980 | Melberg et al. | 364/200 |
| 4,262,329 | 4/1981 | Bright et al. | 364/200 |
| 4,310,720 | 1/1982 | Check, Jr. | 364/900 X |
| 4,328,542 | 5/1982 | Anastas et al. | 364/200 |
| 4,430,728 | 2/1984 | Beitel et al. | 364/900 |
| 4,446,519 | 5/1984 | Thomas | 364/200 X |
| 4,458,315 | 7/1984 | Uchenick | 380/4 X |
| 4,471,163 | 9/1984 | Donald et al. | 178/22.08 |
| 4,475,175 | 10/1984 | Smith | 364/900 |
| 4,484,306 | 11/1984 | Kulczyckyj et al. | 364/900 |
| 4,486,828 | 12/1984 | Kitamura et al. | 364/200 |
| 4,506,346 | 3/1985 | Bennett | 364/900 |
| 4,558,176 | 12/1985 | Arnold et al. | 380/4 |
| 4,562,306 | 12/1985 | Chou et al. | 380/4 |
| 4,578,530 | 3/1986 | Zeidler | 178/22.09 |
| 4,588,991 | 5/1986 | Atalla | 380/4 X |
| 4,652,990 | 3/1987 | Pailen et al. | 380/4 |
| 4,658,093 | 4/1987 | Hellman | 380/4 X |
| 4,683,553 | 7/1987 | Mollier | 364/900 |

FOREIGN PATENT DOCUMENTS

| | | |
|---|---|---|
| 0084441 | 7/1983 | European Pat. Off. |
| 58-195975 | 11/1983 | Japan . |
| 58-208861 | 12/1983 | Japan . |
| 59-41061 | 3/1984 | Japan . |

OTHER PUBLICATIONS

Patent Abstracts of Japan, vol. 6, No. 183 (P-143) [1061], 18th Sep. 1982; & JP-A-57 97 162 (Fujitsu K.K.), 16-06-1982.
Patent Abstracts of Japan, vol. 7, No. 180 (P-215) [1315], 9th Aug. 1983; & JP-A-58 82 355 (Hitachi Seisakusho K.K.) 17-05-1983.
"Shurlock", Sales Literature of Software Security, Inc., Apr. 83.

*Primary Examiner*—Raulfe B. Zache
*Assistant Examiner*—Florin Munteanu
*Attorney, Agent, or Firm*—Andrus, Sceales, Starke & Sawall

[57] ABSTRACT

Apparatus for controlling the use of software in accordance with authorized software license limits, including a limit of the number of concurrent usages of a particular software in a computer system having one or more operator terminals and a central processor containing the software. The apparatus includes a receiver that monitors usage requests from the software in the central processor. A microprocessor based controller accesses authorized use data stored in an EEPROM. Depending on the propriety of usage requests, the controller and an interruptor and transmitter coupled to the central processor and its software prevents operation of the software and/or provides warning messages on the terminal screen.

24 Claims, 4 Drawing Sheets

APPARATUS FOR CONTROLLING THE USE OF COMPUTER SOFTWARE

BACKGROUND OF THE INVENTION

1. Field of the Invention

The present invention relates to a device or apparatus for protecting computer software against unauthorized use or transfer. More particularly, the present invention relates to a combination software and hardware device for use with computer systems having one or more consoles or terminals connected to a central processor.

2. Description of the Related Art

Computer software, programs, or packages of programs are often licensed by the developer or other supplier to the user or customer. The software license may provide that, for a prescribed payment, the program can be used a given number of times, or for a given number of hours, or on a particular computer system, or on a given number of terminals. Licensing of software on a per terminal basis would be highly desirable as a convenient way to distinguish small users from large users and adjusting payments accordingly.

However, once the software is provided to the customer by the supplier, it is currently very difficult for the supplier to thereafter control the access, use, or transfer of the software. It is correspondingly difficult for the supplier to police the software license. As a result, suppliers are often reluctant to enter into limited licenses. The advantages of such licenses, for example lower cost to small users or flexible pricing, are lost.

SUMMARY OF THE INVENTION

Techniques for the control or protection of computer programs currently use either a software approach or a hardware approach. A hardware approach to unauthorized use of computer programs typically employs a physical key, such as a specially coded card that must be inserted in a lock in the computer system before access can be had to the program. The key provides data, such as an electronic serial number or authorization number. The correctness of this data must be properly verified before a program can be run. Or, a programmable read-only memory (PROM) may be inserted in the computer system. The program then detects an authorization number in the PROM to permit the program to operate. Another approach is to put authorization data, such as a serial number physically in the circuitry of the computer system. When the program is initially run, the authorization data of the computer system is entered in a blank in the program. Thereafter, the program will only run if that authorization data is present.

While the security provided to the program is high with the hardware approach, there are factors which limit its use. A major drawback is cost, both in the key and in the modification to the computer system. This has tended to limit the hardware approach to protection of large, expensive software programs. Many manufacturers do not put a serial number in the circuitry of the computer. Also, if the computer circuitry must be changed, there is a problem of getting the new authorization data into the program. Further, the hardware approach is not particularly well suited for situations where use of the program is to be permitted but under limited conditions.

In the software approach to program protection, the program is altered by encryption techniques so that it is not accessible without a software key placed on the medium containing the program, such as a computer disc. The software approach is less expensive than the hardware approach but less secure. There are, further, several problems in the software approach. One is that it prevents legitimate copying as where an authorized user wishes to make a back-up copy of the program. A second drawback is that devices known as nibble copiers can duplicate all the software on the disc, including the software key so that the security is greatly compromised. Nor does the software approach protect against an unauthorized taking of the program from one computer system to another, since the security data is transferred along with the program.

Because of the shortcomings of the hardware only and software only approaches, combined software and hardware techniques are becoming available. One such approach to prevent copying places a unique pattern or fingerprint on blank media, such as floppy discs, for storing the program. The program is placed on the disc by the manufacturer through software that encrypts the program source code several times to link the encrypted program to the unique pattern. The program can then only be accessed if the pattern is present, thus preventing copying of the program. However, this, and similar approaches, are limited to the media element of the computer system.

None of the foregoing techniques permit authorized use but prevent use of the program or software outside limits authorized or established in a software license.

The present invention is directed to a software-hardware device for controlling use of programming contained in a main or host computer, from one or more computer terminals or consoles. The use may be controlled in accordance within limits established in a software license.

For this purpose, the device is coupled to the central processing of the computer system. Data not significant to security, for example, that occurring during the ordinary operation of the computer system passes unimpeded between the central processor and the terminal.

When data having significance from the security standpoint is sent from a terminal to the central processor, the computer system will interrogate the security device of the present invention. Such data might typically be a request to run a particular program. The device has the use limits permitted by the software license programmed into it. If the request is proper and within the limits established by the software license, operation of the program is permitted. If a request is not proper, the security device produces a variety of consequences. For infrequent improper requests, operation of the program may be permitted depending on the applications program, but with an appropriate warning displayed on the computer terminal. For frequent improper requests, operation of the program is blocked by the security device until released by the software owner or supervisory personnel.

The device of the present invention, which is independent of the central processor, thus monitors program usage requests so as to properly control use of the programs in the central processor.

By contrast to other approaches to program security, the device of the present invention is an intelligent device having interactive capabilities. For this purpose, the device of the present invention may employ a micro-processor. The device is readily auditable to ascertain what programs are authorized and the limits of that authorization. The device may also store commercial data relating to the programs, such as the name of the software licensee. The authorization can easily be changed in the field through a local terminal or through a remote terminal connected by a modem. Warning messages and the like provided by the device can be similarly changed.

A salient feature of the present invention is the use of units, such as cartridges, that can be inserted in the device to permit control of the authorization of software application packages or supplier designated software products, such as word processing or graphics programs. This provides increased authorization control, maintainability, and field reliability. For instance multiple software suppliers can control and maintain use of their products without coordination with other software suppliers in a single computer system. This is in contrast to past approaches in which a single knowledgeable source of the authorized configuration must be reached to restore operation of the computer system following field failure.

DESCRIPTION OF THE PREFERRED EMBODIMENT

Figure 1:
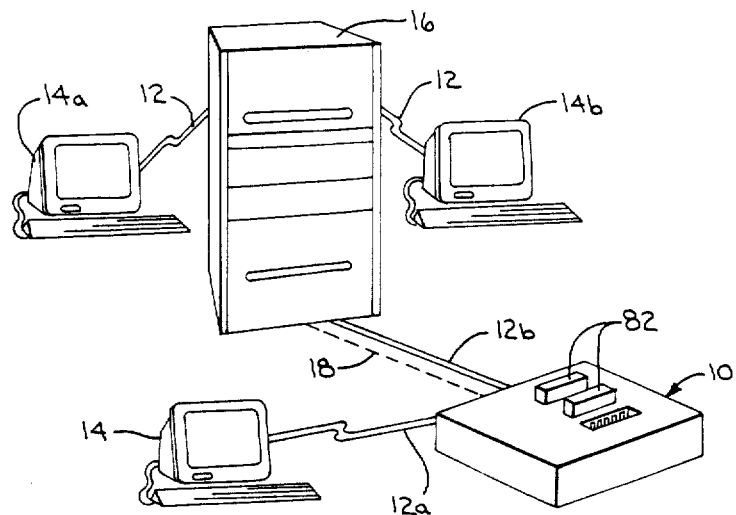
FIG. 1 is a diagram showing the software protection device of the present invention in a computer system having a central processor and one or more terminals.
Figure 2:
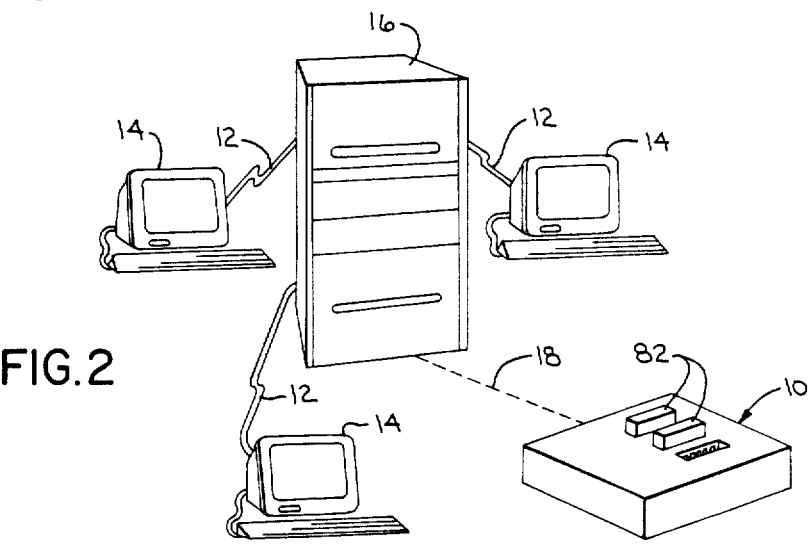
FIG. 2 is a diagram showing an alternate connection of the software protection device in a computer system.

In FIG. 1, the software protection device of the present invention is identified by the numeral 10. Device 10 may be interposed in data signal link or line 12a and 12b between computer terminal 14 and central processor 16 of a computer system. Other terminals 14a, 14b may be connected to central processor 16. For some types of central processor, a second connection between device 10 and computer 16 may be made by link or line 18 for security purposes because of the particular operating system used. Line 18 is connected to an additional peripheral port of central processor 16. Or, device 10 may be connected only to its own port by line 18, as shown in FIG. 2.

Figure 3:
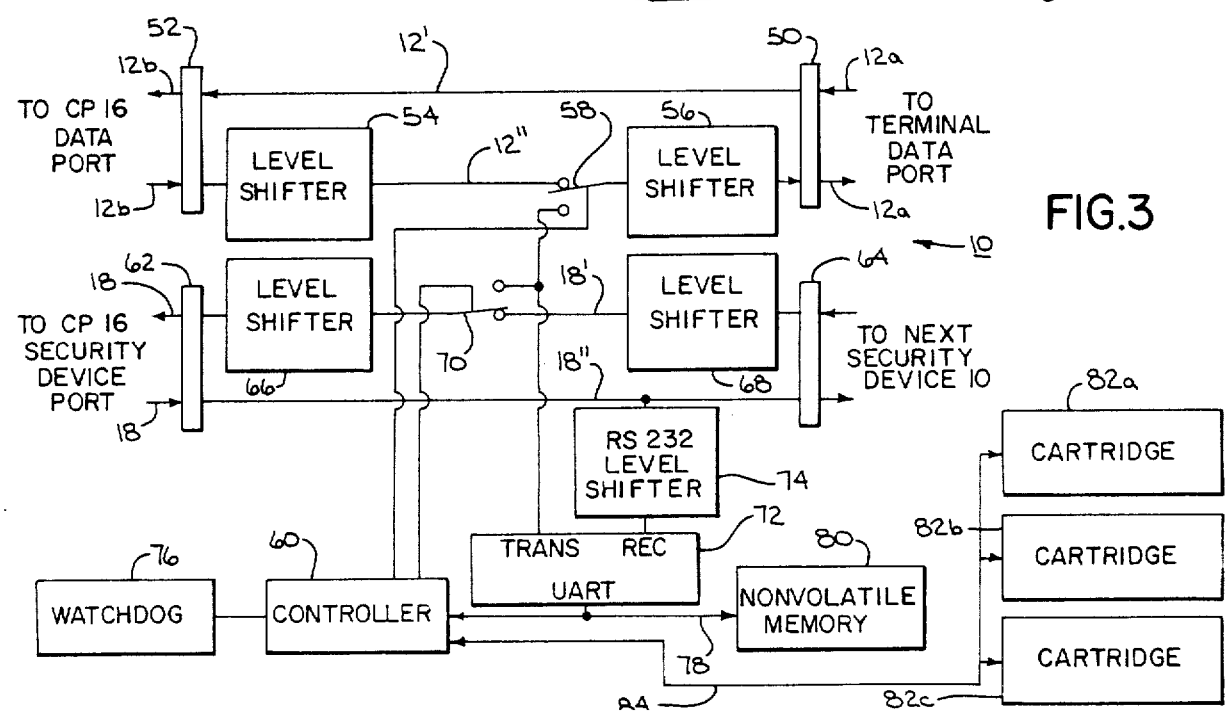
FIG. 3 is a schematic diagram of the software protection device of the present invention connected, as shown in FIG. 1, to the central processor.

The internal configuration of device 10 is shown in FIG. 3. The device 10 shown in FIG. 3 is suitable for the connection shown in FIG. 1. Data signal line 12a from terminal 14 is coupled to port 50 of device 10. Data signal line 12b, connected to the data port of central processor 16, is coupled to data port 52 of device 10. Internal lines 12' and 12" connect ports 50 and 52 to maintain the data signal path between terminal 14 and central processor 16. The arrows shown in FIG. 3 symbolically show the flow of data to and from central processor 16 and terminal 14. Line 12" contains signal level shifters 54 and 56 that alter the signals in line 12" to levels appropriate for the operation of device 10, central processor 16, and terminal 14. Level shifters 54 and 56 may comprises integrated circuit RS 232 level shifters, such as that made and sold by National Semiconductor Corp., under the model no. 1488 or 1489. Line 12" also includes an interrupt means 58, shown diagrammatically as a switch operable by controller 60. Interrupt means 58 may be operated by controller 60 to cause the display of warning messages on terminal 14 in certain operating modes of the device and to disable data signal lines 12a, 12b from the standpoint of passing normal data traffic under certain conditions of attempted unauthorized use, as described below.

Figure 7:
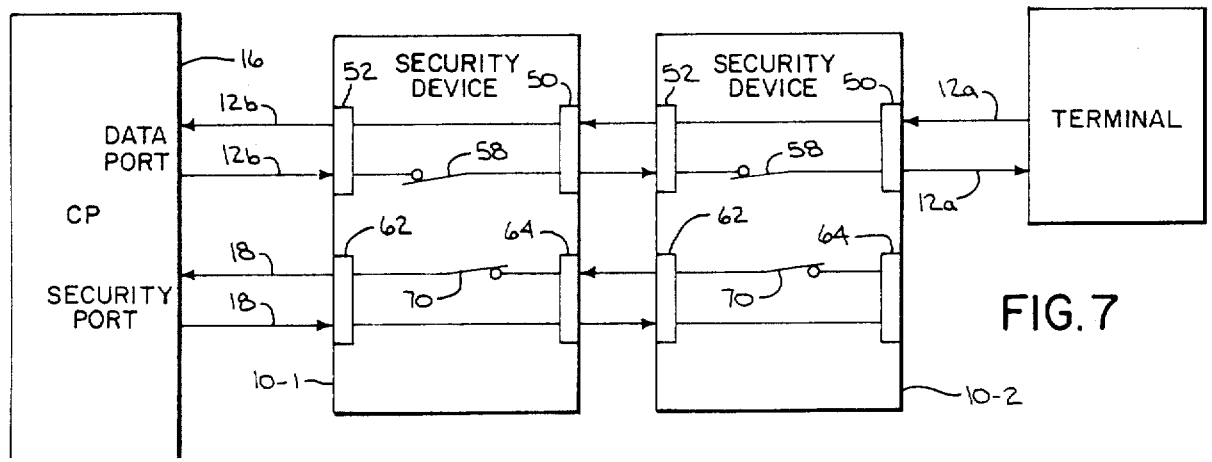
FIG. 7 is a schematic diagram showing use of a plurality of security devices of the present invention to increase the number of programs that can be protected.

A second pair of internal data lines 18' and 18" are provided in device 10. Lines 18' and 18" are connected to port 62 and to security data line 18 leading to the additional peripheral port of central processor 16. The other ends of lines 18' and 18" may be connected to port 64 that permits additional security devices to be connected in series with the device shown in FIG. 3, as shown in FIG. 7. Data line 18' includes signal level shifters 66 and 68 similar to level shifters 54 and 56. Data line 18' also includes an interrupt means 70 operable by controller 60 to supply information and commands to the software program in central processor 16.

Universal asynchronous receiver-transmitter 72 has the receiver port connected through level shifter 74 to data line 18". The transmit port is connected to interrupt means 58 and 70. Receiver-transmitter 72 may comprise an integrated circuit, such as that made and sold by Signetics, as model no. SCN2651.

Controller 60, may be a microprocessor, such as that made and sold by Motorola Corporation, of Phoenix, Ariz., under the designation MC6809. Watchdog 76 may comprise a monostable multivibrator that clocks and resynchronizes controller 60 to insure proper operation of controller 60.

Data bus 78 connects controller 60 to memory 80. Memory 80 may comprise an electronically erasable programmable read only memory (EEPROM). Universal asynchronous receiver transmitter 72 is connected to data bus 78.

Memory 80 contains data relating to the operating system for central processor 16. It may also contain the data maintenance and operating programs for device 10, as well as a map of the data contained in cartridges 82 hereinafter described.

Data relating to the programs authorized to run on the computer system 14–16 are contained in plug-in cartridges 82a, 82b, and 82c. These plug-in cartridges may each comprise an electronically erasable programmable read only memory (EEPROM) containing data specific to a particular vendor. The EEPROM contains the limits of authorization for the various programs and packages contained in central processor 16. A map of the data in the cartridge is also included in the EEPROM. The cartridges are connected to controller 60 by data bus 84.

Figure 4A:
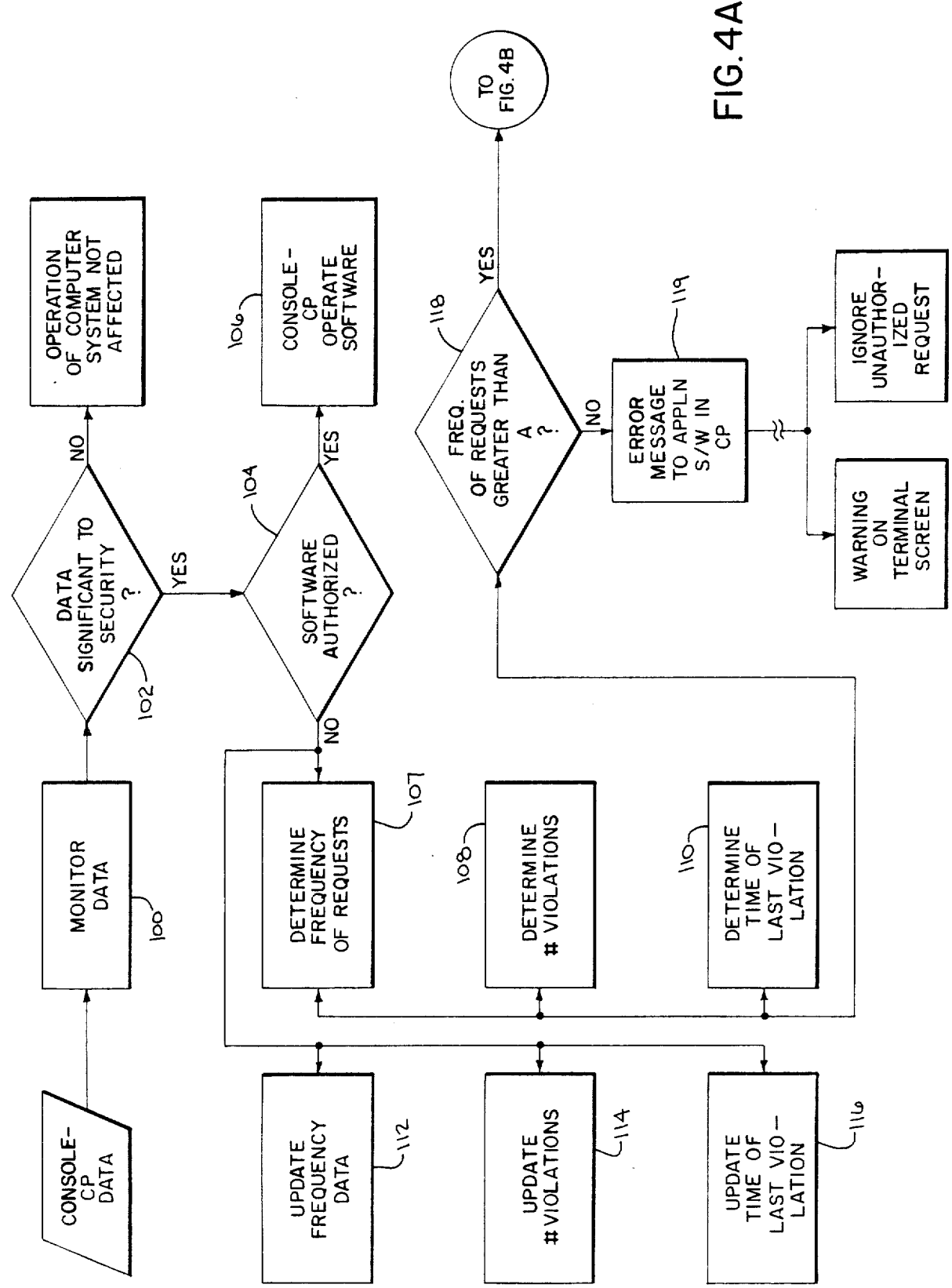
FIGS. 4A and 4B are flow charts showing operation of the software protection device of the present invention.
Figure 4B:
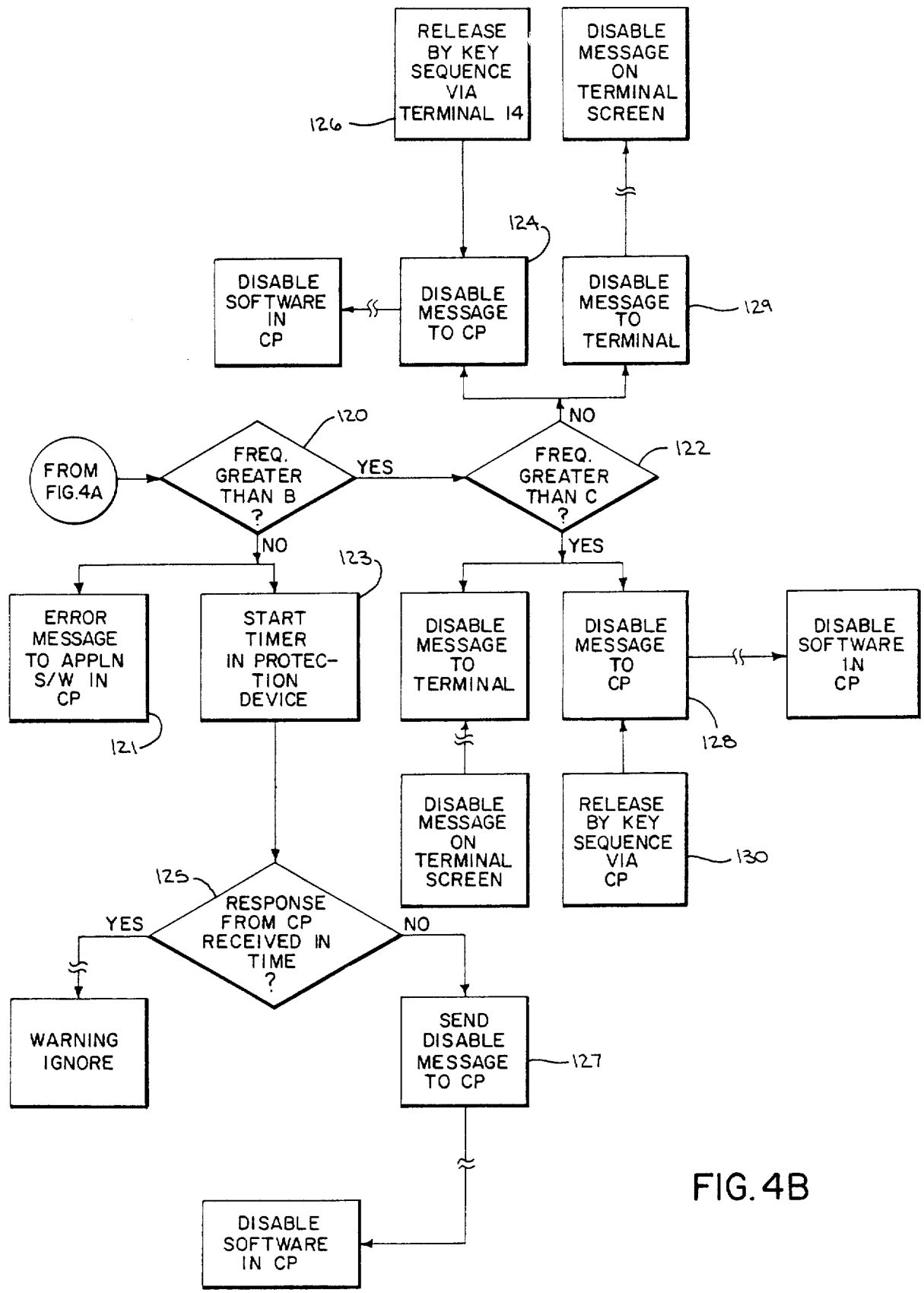

Device 10, operates as follows, as shown in flow chart form in FIG. 4. Device 10 monitors line 18 from the security port of central processor 16 as at step 100 in FIG. 4 to ascertain the presence of information significant to program security. Thus when a request from terminal 14 to central processing unit 16, via the applications software program in central processor 16, requests authorization to run a particular program, the application software in central processor 16 will, in turn, issue a request in security lines 18 to device 10 as at step 102 to inquire whether running of the program is authorized. The request will be received by universal asynchronous receiver-transmitter 72 and provided to controller 60. Controller 60 through data bus 84 will interrogate the applicable cartridge 82 to obtain the authorization data relating to the requested program, as at step 104. If the request is within the authorization provided in the software license, controller 60 will provide a response through receiver-transmitter 72 in data bus 18', 18" to the associated port of central processor 16 indicating to the computer system that operation of the program is authorized. The program is then permitted to run. This is shown in FIG. 4 as step 106.

If the analysis of the request for program authorization at step 104 indicates that the request is not within authorized limits, the following operation will occur. The applicable cartridge 82 contains data relating to the number of unauthorized requests for the program; the time of the last unauthorized request; and a moving average of the frequency of unauthorized requests. This data is interrogated by controller 60 via data bus 84 at steps 107, 108, and 110 of FIG. 3. At the same time the stored data is updated at steps 112, 114, and 116. Computation of the moving average may employ an exponential smoothing function in which latter entries may be related to earlier entries in a desired manner to reflect the number of incidents of significance in the average.

Based on the frequency at which unauthorized requests are occurring, one of four events will occur in protective device 10. The frequency levels at which the various events will occur are programmed into cartridges 82 by the software supplier.

A very low frequency of unauthorized requests indicates that the unauthorized requests are probably occurring through inadvertency or genuine error. For example, a terminal operator may inadvertently request the wrong program. Or, the correct program may be requested but at the wrong time.

If the frequency of unauthorized requests is less than some predetermined number A programmed into the applicable cartridge 82, as determined in step 118 of FIG. 4, an error message is sent to central processor 16 from protective device 10 at step 119 for whatever further action may be undertaken by the applications software. The message will be provided from receiver-transmitter 72, as controlled by controller 60, and interrupt device 70. The message indicates that a violation has occurred but that it is a low level violation. This may be termed a Level I violation. The applications software will typically provide a warning on the operator's terminal screen 14. Other typical action that could be taken by the application software might include entry in a master log in central processor 16 or the provision of a warning signal to a supervisory terminal connected to central processor 16. Normally the application software would be permitted to run after the appropriate warning signal has been recorded and/or given, as shown in FIG. 4. For infrequent violations, it will be appreciated that the operation of device 10 is basically open loop. Messages are sent to central processor 16 but no other action is taken by device 10.

If the unauthorized requests are occurring at a greater frequency, this may be taken as evidence that some deliberate attempt is being made to make unauthorized use of the programs in central processor 16. Step 120 in the flow chart of FIG. 4 ascertains that the frequency of unauthorized requests is greater than the threshold A of step 118 but less than some greater frequency B also programmed into the applicable cartridge 82. This may be termed a Level II violation. Under this circumstance, an error message is sent to the application software in central processor 16, as at step 121, similar to the action 119 taken for low frequency violations. However, additionally, a timer provided in controller 60 is set in operation as at step 123. If security device 10 does not receive an appropriate response from the software in central processor 16, within the time period of the timer as at step 125, receiver-transmitter 72 provides a signal in line 18 from interrupt device 70 to disable that particular piece of software from running in central processor 16 as at step 127. The computer system can run other software for which authorization is not required or for which authorization is properly obtained.

If the software in central processor does provide the appropriate response to protection device 10 within the time period of the timer, the software is permitted to run in the same manner as described in connection with step 118. The additional action discussed above would ordinarily be taken, such as a warning on terminal screens, entry in master logs, and the like. The operation of device 10 just described is closed loop in that a response, or lack thereof, from central processor 16 back to device 10 is involved in the operation.

If the violation frequency is greater, than the threshold provided in step 120 but less than some higher threshold C, as determined in step 122 shown in the flow chart of FIG. 4, receiver-transitter 72 and controller 60 operate interrupt device 70 that acts directly on central processor 16 to disable the program, as at step 124. Receiver-transmitter 72 and controller 60 also operates interrupt device 58 to send a disable message directly from device 10 to terminal 14, as at step 129. This is a Level III violation.

For Level III violations, operation of the computer system can only be restored or released by the insertion of a key sequence from computer terminal 14 to controller 60 or cartridge 82 as at step 126. This could be done by the user's supervisory personnel. Or it could be done by a field service representative of the program supplier, either locally through user's terminal 14 or remotely from a terminal of the supplier connected by a modem.

It should be noted that, at violation Level III, the operation of protection device 10 does not depend on the application software in central processor 16. Rather, protection device 10 operates independently on central processor 16 to disable operation of the protected software.

For very, very frequent violations greater than frequency C, that can only indicate deliberate attempts to make unauthorized use of the program, protection device 10 again disables the program in the same manner as described in the preceding paragraph as at step 128. However, protection device 10 will only restore operation of the protected software by a key sequence inputed to controller 60 from the program supplier's factory, as through a modem connected either to central processor 16 or protective device 10 or from terminal 14, as at step 130. This is termed a Level IV violation.

Data relating to the number of unauthorized requests and the time they are occurring indicated at steps 114 and 116 in FIG. 4 may be used to assist in detecting the source of the unauthorized requests.

In a usual embodiment of software protection device 10, the typical data shown in the following data table would be provided in each cartridge 82. It is anticipated that each cartridge 82 could typically be of sufficient storage capacity for the data relating up to approximately one hundred software packages. The data table is as follows.

I. Cartridge Related Data
  A. Serial number of cartridge
  B. Cartridge modification count
  C. Cartridge Shipping date
  D. Last cartridge update
  E. Date that software authorization will terminate
  F. Date of warning of impending termination
  G. Run hours
  H. Cartridge maintenance data
    1. Access validation data (validates access to cartridge data)
    2. Modification validation data (validates modification)
  I. Warning messages text
  J. Owner of software license
  K. Software reseller No. 1
  L. Software reseller No. 2
II. Software Package related data.
  A. Identification of software package
  B. Authorization data
    1. Demonstration package?
    2. Non-demonstration package
      a. terminals allowed for this software package
      b. number of currently active terminals
      c. total numer of terminals authorized
  C. Detection data
    1. Criteria
      a. level required for warning
      b. level required for timed disable
      c. level required for terminal released disable
      d. level required for cp released disable
    2. Occurrence data
      a. number of violations usages
      b. time of last violation
      c. moving average of frequency of violations.

The foregoing data table provides the data necessary for operation of the protective system, as well as the necessary control information to the software supplier.

As will be noted from the data table, cartridges 82 may be reprogrammed from terminal 14 to alter the limits of authorization. For example, in return for increased payments, the limits of authorization can be expanded. Any such changes require proper validation and modification access data or passwords.

The application software may be transferred to another central processor by transferring both the software and protection device 10, or at least the appropriate cartridge 82. However, if transfer of the software is attempted without the cartridge 82, the software cannot be made to run.

Figure 5:
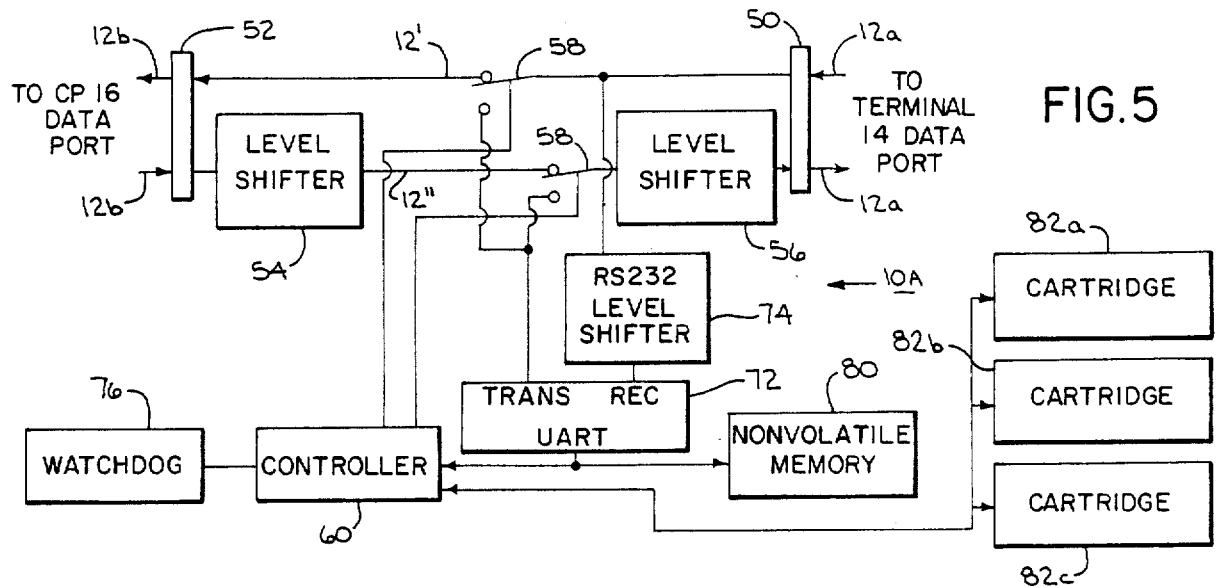
FIG. 5 is a schematic diagram showing the details of the software protection device of the present invention connected to a computer system in a manner alternative to FIGS. 1 and 2.

FIG. 5 shows a device 10A of the present invention suitable for use with a computer system having only a single data line 12 for both data and security information. The configuration of device 10A generally resembles that of device 10 as shown in FIG. 2. Interrupt means 58 is connected in data signal line 12 to disable operation of the software and provide messages from receiver-transmitter 72 to the screen of terminal 14.

Figure 6:
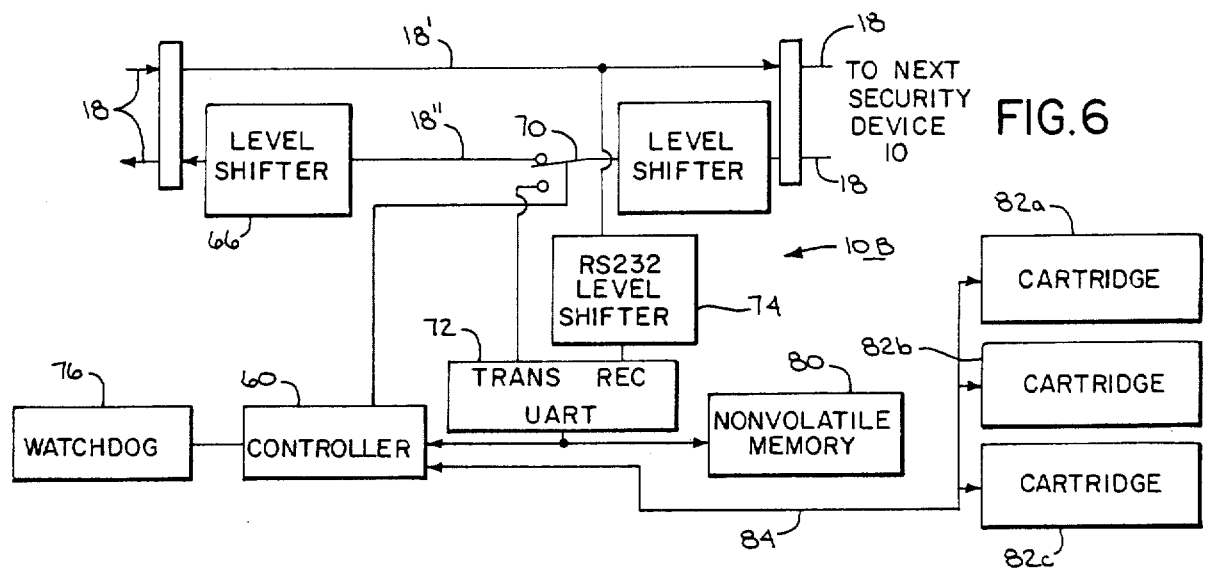
FIG. 6 is a schematic diagram showing details of the software protection device of the present invention suitable for connection to the computer system as shown in FIG. 2.

FIG. 6 shows a device 10B of the present invention suitable for operating solely through the associated additional peripheral port of central processor 16. All warning and interrupt messages are transmitted through this port of the central processor.

FIG. 7 schematically shows use of a plurality of software protection devices 10-1, 10-2 and the associated interrupt devices 58 and 70 between terminal 14 and central processor 16. Protection devices 10-1 and 10-2 are connected in series on security line 18 and/or, if applicable, on data signal line 12. The use of additional protection devices 10 increases the number of software packages that can be protected.

We claim:

1. Apparatus for monitoring the use of software in a computer system with respect to at least one selected aspect of such use, said computer system having at least one central processor containing the software, said central processor being accessed by at least one operator terminal connected to said central processor, software in the central processor generating usage indicative of monitored software use conditions for the selected aspect in the computer system, the apparatus employing at least two pre-established levels of occurrences of conditions violative of an usage limit for the selected aspect in exerting restrictions on the use of the monitored software, said apparatus comprising:

receiving means coupled to the central processor for receiving said monitored software usage data from software in the central processor;

memory means containing data establishing the software usage limit for the selected aspect, said memory means containing data establishing the violative condition occurrence levels, said memory means storing violative condition occurrence data arising out of the operation of the computer system and recording data indicative of existing usage of the monitored software;

microprocessor control means coupled to said receiving means and said memory means for determining conditions violative of the usage limit in response to said usage data and whether the occurrence of violative conditions bears a predetermined relationship to a violative condition occurrence level, said control means being set to a first state that permits use of the monitored software in the central processor and or to second state that restricts use of the monitored software, said control means changing from said first state to said second state when the occurrence of violative conditions bears said predetermined relationship, wherein said control means can be reset from the second state to the first state by remotely generated resetting instructions; and interrupt means coupled to the computer system and said control means, said interrupt means being controlled by said control means for providing an output to the computer system when said control means is in said second state for restricting use of the monitored software.

2. The apparatus according to claim 1 wherein said control means and interrupt means provide a signal indicating improper usage requests to the software in the central processor upon the existence of a first occurrence level.

3. The apparatus according to claim 1 wherein said control means and interrupt means prevent monitored software from operating in the central processor upon the existence of a second occurrence level.

4. The apparatus according to claim 1 wherein said memory means contains data establishing levels in the frequency of violative condition occurrences.

5. The apparatus according to claim 4 including timing means in said control means having a predetermined timing interval, said timing means commencing a timing interval when the frequency of violative condition occurrences exceeds a preestablished level, said control means and interrupt means providing a signal to the software in the central processor indicating commencement of the timing interval and providing a signal preventing the monitored software from operating in the central processor unless a response is received from the central processor within the timing interval of said timer.

6. Apparatus for restricting the use of monitored software in a computer system in accordance with an usage limit established for the number of permitted concurrent usages of the monitored software, said computer system having at least one central processor containing the monitored software, said central processor being accessed by at least two operator terminals connected to said central processor, software in the central processor generating usage data indicative of the number of concurrent usages of the monitored software, the apparatus employing at least one pre-established level of occurrences of conditions violative of the usage limit in exerting restrictions on the use of the monitored software, said apparatus comprising:
    receiving means coupled to the central processor for receiving said monitored software usage data from the software in the central processor;
    memory means containing preset data establishing the software usage limit for the number of concurrent usages of the monitored software, said memory means containing data establishing the violative condition occurrence level, said memory means storing violative condition occurrence data arising out of the operation of the computer system and recording data indicative of the concurrent usages of the monitored software;
    microprocessor control means coupled to said receiving means and said memory means for determining conditions violative of the usage limit in response to said usage data and whether the occurrence of violative conditions bears a predetermined relationship to the violative condition occurrence level; and
    interrupt means coupled to the computer sytem and said control means, said interrupt means being controlled by said control means for providing an output to the computer system for restricting use of the monitored software when occurrences of violative conditions bear said predetermined relationship to the violative condition occurrence level.

7. The apparatus according to claim 6 wherein the concurrent use is evidenced by the number of operator terminals concurrently using the monitored software and wherein said apparatus is further defined as restricting use of the monitored software in accordance with a usage limit established for the number of operator terminals permitted to concurrently use the monitored software.

8. The apparatus according to claim 6 wherein said memory means contains data establishing at least two violative condition occurrence levels.

9. The apparatus according to claim 8 wherein said control means and interrupt means provide a signal indicating improper usage requests to the software in the central processor upon the existence of a first occurrence level.

10. The apparatus according to claim 8 wherein said control means and interrupt means prevent the monitored software from operating in the central processor upon the existence of a second occurrence level.

11. The apparatus according to claim 6 wherein said memory means contains data establishing levels in the frequency of violative condition occurrences.

12. The apparatus according to claim 11 further including timing means in said control means having a predetermined timing interval, said timing means commencing a timing interval when a frequency of violative condition occurrences exceeds the preestablished level, said control means and interrupt means providing a signal to the software in the central processor indicating commencement of the timing interval and providing a signal preventing the monitored software from operating in the central processor unless a response is received from the central processor within the timing interval of said timer.

13. The apparatus according to claim 6 wherein said control means is set to a first state that permits use of software in the central processor or to a second state that restricts use of software, and wherein said control means can be reset from the second state to the first state.

14. The apparatus according to any one of claims 2 or 9 further including transmitter means coupled to said control means and to said interrupt means for transmitting warning signals generated by said control means to said central processor.

15. The apparatus according to any one of claims 2, or 9 wherein said interrupt means is coupled to at least one operator terminal, said apparatus further including transmitter means coupled to said control means and to said interrupt means for transmitting warning signals generated by said control means to at least one of the operator terminal and central processor.

16. The apparatus according to any one of claims 1, or 6 wherein said interrupt means is coupled to the central processor by means of a data signal link and wherein said receiver means is coupled to the data signal link.

17. The apparatus according to one of claims 1, or 6 wherein the central processor of the computer system has a security signal port and wherein said interrupt means and receiver means are coupled to the security signal port of the central processor.

18. The apparatus according to any one of claims 1, or 6 wherein the central processor of the computer system has a a security signal port and has a data signal link, wherein said interrupt means includes means coupled to the data signal link and means coupled to the security signal port, and wherein said receiving means is coupled to said security signal port.

19. The apparatus according to any one of claims 1, or 6 wherein said memory means is contained in an element removable from said apparatus.

20. The apparatus according to any one of claims 1, or 6 wherein said memory means is further defined as comprising programmable memory means in which the data of the memory means may be altered.

21. The apparatus according to claim 20 wherein said memory means comprises an EEPROM.

22. The apparatus according to one of claims 1, or 6 wherein the central processor of the computer system has an operating system and wherein said apparatus further includes additonal memory means coupled to said control means containing data relating to the operating system of the central processor.

23. The apparatus according to claim 22 wherein said additional memory means comprises an EEPROM.

24. The apparatus according to any one of claims 1, or 6 wherein said receiving means and said interrupt means include means for connecting an additional software use monitoring apparatus in series therewith, said apparatus further including a plurality of software use monitoring apparatuses connected in series for monitoring additional software in the computer system.

* * * * *